(12) United States Patent
Takeuchi

(10) Patent No.: US 10,009,710 B2
(45) Date of Patent: Jun. 26, 2018

(54) INFORMATION PROCESSING APPARATUS, TRANSMISSION CONTROL METHOD, AND INFORMATION PROCESSING SYSTEM

(71) Applicant: SONY CORPORATION, Tokyo (JP)

(72) Inventor: Yasuo Takeuchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days. days.

(21) Appl. No.: 15/119,190

(22) PCT Filed: Dec. 3, 2014

(86) PCT No.: PCT/JP2014/082028
§ 371 (c)(1),
(2) Date: Aug. 16, 2016

(87) PCT Pub. No.: WO2015/129123
PCT Pub. Date: Sep. 3, 2015

(65) Prior Publication Data
US 2017/0013396 A1    Jan. 12, 2017

(30) Foreign Application Priority Data
Feb. 26, 2014    (JP) .................................. 2014-035324

(51) Int. Cl.
*H04B 5/00* (2006.01)
*H04W 4/00* (2018.01)
*G06K 7/10* (2006.01)

(52) U.S. Cl.
CPC ........ *H04W 4/008* (2013.01); *G06K 7/10009* (2013.01); *H04B 5/0056* (2013.01)

(58) Field of Classification Search
CPC .. H04W 4/008; H04B 5/0056; G06K 7/10009
(Continued)

(56) References Cited

U.S. PATENT DOCUMENTS

2012/0201193 A1*  8/2012  Sugiyama .............. H04B 7/155
                                                                  370/315

FOREIGN PATENT DOCUMENTS

JP       06-311069 A      11/1994
JP       2009-009367 A    1/2009
JP       2012-216172 A    11/2012

OTHER PUBLICATIONS

GlobalPlatform, GlobalPlatform Card Specification v2.3, Available at: https://www.globalplafform.org/specificationscard.asp., retrieved on Apr. 4, 2016, pp. 3.

(Continued)

*Primary Examiner* — Eugene Yun
(74) *Attorney, Agent, or Firm* — Chip Law Group

(57) ABSTRACT

There is provided an information processing apparatus including a transmission control unit configured to, when first carrier information indicating that no carrier is detected is acquired from a communication control apparatus capable of performing contactless communication using a carrier with an external apparatus, control a timing at which the acquired first carrier information is transmitted to a transmission object configured to execute a predetermined process according to the first carrier information. The transmission control unit transmits the first carrier information to the transmission object when a set waiting time has elapsed after the first carrier information was acquired. The transmission control unit does not transmit the first carrier information to the transmission object when second carrier information indicating that the carrier is detected is acquired before the waiting time has elapsed.

13 Claims, 4 Drawing Sheets

(58) Field of Classification Search
USPC .......................................................... 455/41.1
See application file for complete search history.

(56) References Cited

OTHER PUBLICATIONS

GlobalPlafform Card—Card Specification v2.2, Available Online at http://www.globalplatform.org/specificationscard.asp, 03 pages.

\* cited by examiner

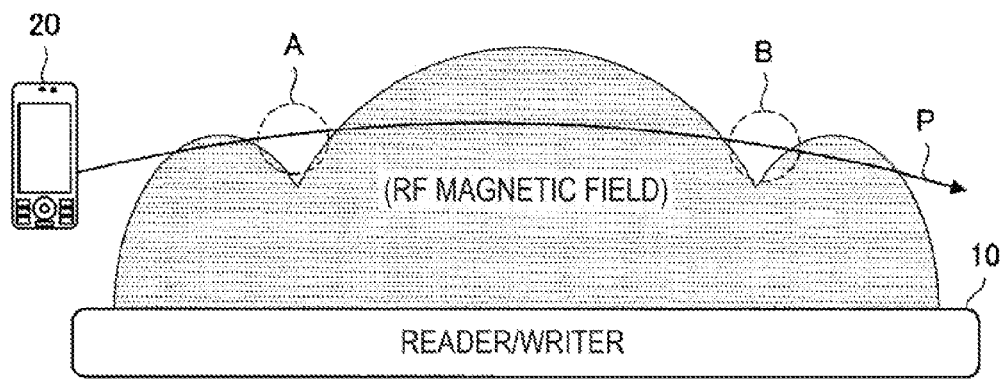

INFORMATION PROCESSING APPARATUS, TRANSMISSION CONTROL METHOD, AND INFORMATION PROCESSING SYSTEM

CROSS REFERENCE TO RELATED APPLICATIONS

This application is a U.S. National Phase of International Patent Application No. PCT/JP2014/082028 filed on Dec. 3, 2014, which claims priority benefit of Japanese Patent Application No. JP 2014-035324 filed in the Japan Patent Office on Feb. 26, 2014. Each of the above-referenced applications is hereby incorporated herein by reference in its entirety.

TECHNICAL FIELD

The present disclosure relates to an information processing apparatus, a transmission control method, a program, and an information processing system.

BACKGROUND ART

In recent years, apparatuses (or systems), such as mobile phones on which contactless integrated circuit (IC) cards or contactless IC chips are mounted, capable of performing contactless communication with readers/writers (or apparatuses with reader/writer functions; the same applies below) have become prevalent. For example, near field communication (NFC; hereinafter also referred to as "contactless communication" in some cases) in which communication is performed with a reader/writer using a magnetic field (carrier) having a predetermined frequency such as 13.56 [MHz] and an apparatus (or a system) capable of performing contactless communication with the foregoing reader/writer is being used.

For the specifications of operating systems (OSs) mounted on ICs or NFC, for example, various specifications have been defined by the industry associations such as Global Platform (GP). As the specification regulated by GP, for example, the specification disclosed in Non-Patent Literature 1 can be exemplified.

CITATION LIST

Non-Patent Literature

Non-Patent Literature 1: GlobalPlatform Card-Card Specification v2.2—Amendment C: Contactless Services v1.1

SUMMARY OF INVENTION

Technical Problem

Apparatuses (or systems; hereinafter referred to as "information processing systems" in some cases) capable of performing contactless communication with external apparatuses such as readers/writers include, for example, communication control apparatuses such as antennas or contactless frontends (CLFs) or information processing apparatuses such as subscriber identify modules (SIMs) or universal integrated circuit cards (UICCs).

Here, when contactless communication is performed between an external apparatus and an information processing system, it is desirable to prevent a process related to contactless communication from being interrupted and to continue the process related to the contactless communication. However, for example, when an existing information processing system cannot receive a magnetic field (carrier) of a predetermined frequency, the information processing system determines that a process related to the contactless communication is uniformly terminated regardless of a situation. Consequently, the existing information processing system lacks flexibility.

The present disclosure proposes a novel and improved information processing apparatus, transmission control method, program, and information processing system capable of continuing a process related to contactless communication.

Solution to Problem

According to the present disclosure, there is provided an information processing apparatus including: a transmission control unit configured to, when first carrier information indicating that no carrier is detected is acquired from a communication control apparatus capable of performing contactless communication using a carrier with an external apparatus, control a timing at which the acquired first carrier information is transmitted to a transmission object configured to execute a predetermined process according to the first carrier information. The transmission control unit transmits the first carrier information to the transmission object when a set waiting time has elapsed after the first carrier information was acquired. The transmission control unit does not transmit the first carrier information to the transmission object when second carrier information indicating that the carrier is detected is acquired before the waiting time has elapsed.

According to the present disclosure, there is provided a transmission control method to be executed by an information processing apparatus, the transmission control method including: a step of controlling, when first carrier information indicating that no carrier is detected is acquired from a communication control apparatus capable of performing contactless communication using a carrier with an external apparatus, a timing at which the acquired first carrier information is transmitted. In the controlling step, the first carrier information is transmitted when a set waiting time has elapsed after the first carrier information was acquired, and the first carrier information is not transmitted when second carrier information indicating that the carrier is detected is acquired before the waiting time has elapsed.

According to the present disclosure, there is provided a program for causing a computer to execute: a step of controlling, when first carrier information indicating that no carrier is detected is acquired from a communication control apparatus capable of performing contactless communication using a carrier with an external apparatus, a timing at which the acquired first carrier information is transmitted. In the controlling step, the first carrier information is transmitted when a set waiting time has elapsed after the first carrier information was acquired, and the first carrier information is not transmitted when second carrier information indicating that the carrier is detected is acquired before the waiting time has elapsed.

According to the present disclosure, there is provided an information processing system including: an information processing apparatus; an antenna; and a communication control apparatus capable of communicating with the information processing apparatus and performing contactless communication using a carrier with an external apparatus via the antenna. The information processing apparatus includes a transmission control unit configured to, when first carrier information indicating that no carrier is detected is acquired from the communication control apparatus, control a timing at which the acquired first carrier information is transmitted to a transmission object configured to execute a predetermined process according to the first carrier information. The transmission control unit transmits the first carrier information to the transmission object when a set waiting time has elapsed after the first carrier information was acquired. The transmission control unit does not transmit the first carrier information to the transmission object when second carrier information indicating that the carrier is detected is acquired before the waiting time has elapsed.

Advantageous Effects of Invention

According to the present disclosure, it is possible to continue a process related to contactless communication.

In addition, the effects described in the present specification are merely illustrative and demonstrative, and not limitative. In other words, the technology according to the present disclosure can exhibit other effects that are evident to those skilled in the art along with or instead of the effects based on the present specification.

BRIEF DESCRIPTION OF DRAWINGS

FIG. 3 is an explanatory diagram illustrating an example of a situation in which instantaneous interruption is caused.

FIG. 4 is an explanatory diagram for describing an example of setting information according to the present embodiment.

FIG. 5 is an explanatory diagram for describing an example of setting information according to the present embodiment.

DESCRIPTION OF EMBODIMENTS

Figure 1:
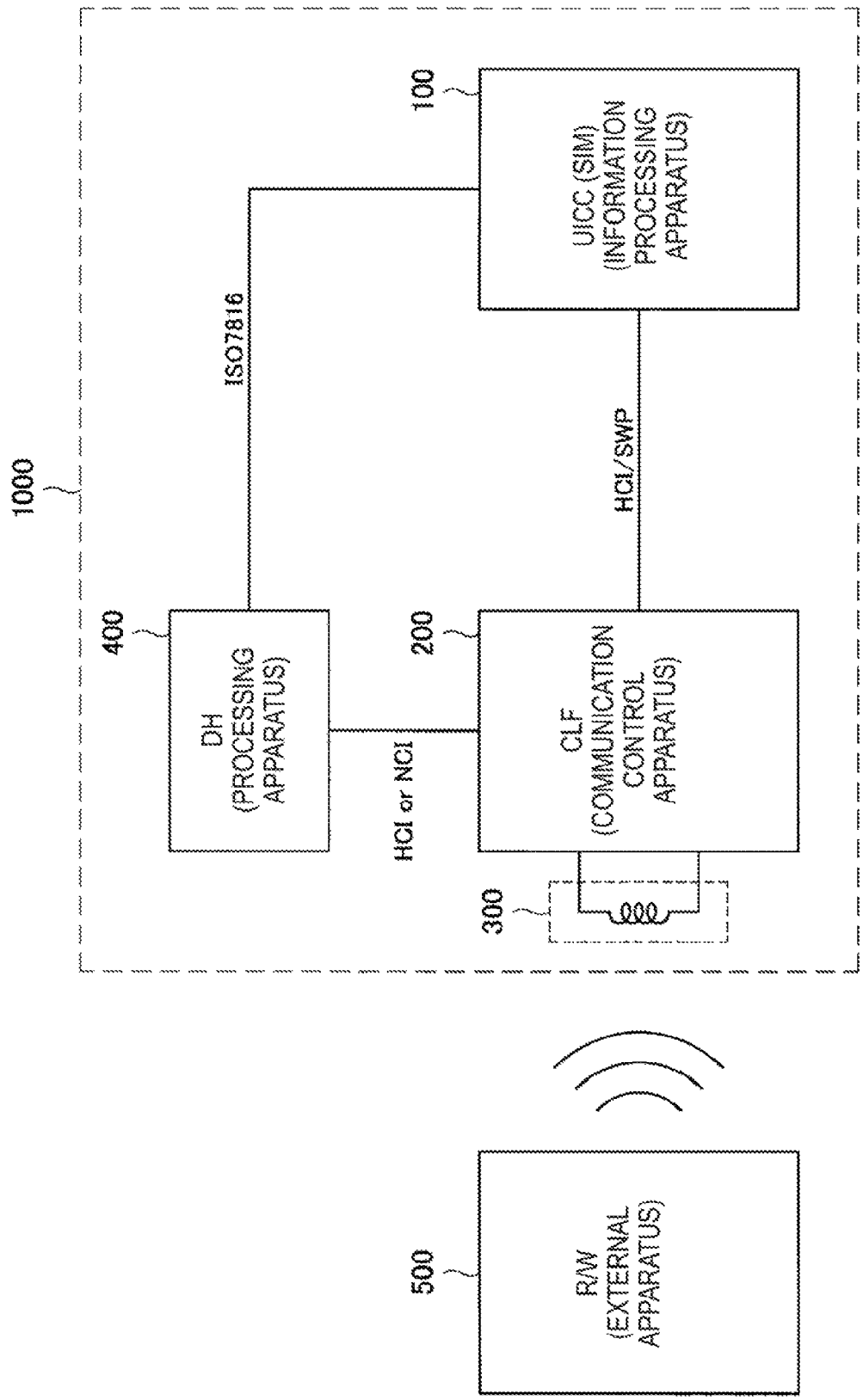
FIG. 1 is an explanatory diagram illustrating an example of the configuration of an information processing system according to an embodiment.

Hereinafter, preferred embodiments of the present disclosure will be described in detail with reference to the appended drawings. In this specification and the drawings, elements that have substantially the same function and structure are denoted with the same reference signs, and repeated explanation is omitted.

Hereinafter, the description will be described in the following order.

1. Information processing method according to embodiment
2. Information processing apparatus according to embodiment
3. Program according to embodiment (Information Processing Method According to Embodiment)

First, an information processing method according to the embodiment will be described. Hereinafter, for example, the information processing method according to the embodiment when a process related to the information processing method according to the embodiment is performed by an information processing apparatus according to the embodiment included in an information processing system according to the embodiment will be described.

When the contactless communication is performed between the external apparatus and the information processing system as described above, it is desirable to prevent a process related to the contactless communication from being interrupted and to continue the process related to the contactless communication. Thus, for example, in the specification disclosed in the above-described Non-Patent Literature 1, a function of "Continuous Processing" is provided. "Continuous Processing" is, for example, a "function of holding, when the execution of a process related to another communication interface except for the contactless communication is requested while a process related to the contactless communication is performed, the execution of the process related to the other communication interface until the process related to the contactless communication being performed is terminated."

On the other hand, when contactless communication is performed between the external apparatus and the information processing system, for example, the "case in which the information processing system is instantaneously outside a magnetic field (carrier) of a predetermined frequency and therefore the contactless communication is not performed (hereinafter referred to as "instantaneous interruption")" occurs. Here, even when the instantaneous interruption is caused, the information processing system enters the magnetic field of the predetermined frequency again, so that contactless communication between the external apparatus and the information processing system is possible.

However, when the instantaneous interruption is caused, the information processing system may determine that the process related to the contactless communication is terminated without performing the contactless communication. Thus, when the instantaneous interruption is caused, the information processing system cannot continue the process related to the contactless communication even when the information processing system enters the magnetic field of the predetermined frequency again. Also, even if the information processing system is configured to have the "Continuous Processing" function, the information processing system cannot similarly continue the process related to the contactless communication.

Therefore, in the present embodiment, the information processing apparatus according to the present embodiment continues the process related to the contactless communication by performing the process related to the information processing method according to the present embodiment shown hereinafter.

[1] Example of Configuration of Information Processing System According to Present Embodiment An example of the configuration of the information processing system according to the present embodiment will be described as an assumption for describing the information processing method according to the present embodiment.

FIG. 1 is an explanatory diagram illustrating an example of the configuration of the information processing system 1000 according to the present embodiment. In FIG. 1, an external apparatus 500 for outputting the magnetic field of the predetermined frequency is also illustrated. Also, in FIG. 1, a reader/writer (which may hereinafter be referred to as "R/W") is illustrated as an example of the external apparatus 500. Hereinafter, the magnetic field of the predetermined frequency may indicate a "carrier" or "RF magnetic field."

The information processing system 1000 includes, for example, an information processing apparatus 100, a communication control apparatus 200, an antenna 300, and a processing apparatus 400.

In FIG. 1, a UICC (or SIM) is illustrated as an example of the information processing apparatus 100 and a CLF is illustrated as an example of the communication control apparatus 200. In FIG. 1, a device host (DH) is illustrated as an example of the processing apparatus 400.

FIG. 1 illustrates an example in which the information processing apparatus 100 and the communication control apparatus 200 perform communication via communication interfaces such as a host controller interface (HCI) and a single wire protocol (SWP). FIG. 1 also illustrates an example in which the information processing apparatus 100 and the processing apparatus 400 perform communication via a communication interface based on the ISO7816 standard. FIG. 1 also illustrates an example in which the communication control apparatus 200 and the processing apparatus 400 perform communication via an HCI or an NFC controller interface (NCI). The communication interfaces for performing the communication between the apparatuses included in the information processing system 1000 are not limited to the examples illustrated in FIG. 1. For example, the apparatuses included in the information processing system 1000 may perform communication via any communication interface or protocol enabling the apparatuses to perform the communication.

[1-1] Overview of Information Processing Apparatus 100

For example, the information processing apparatus 100 performs processes based on various signals transmitted from the external apparatus 500 when the various signals transmitted from the external apparatus 500 are received from the communication control apparatus 200. Also, the information processing apparatus 100 may perform the process, for example, in conjunction with an external apparatus (or external device) such as the processing apparatus 400. Then, the information processing apparatus 100 transmits response signals according to processing results to the communication control apparatus 200.

Also, the information processing apparatus 100 plays a role in performing a process related to an information processing method to be described below and controls a timing at which acquired carrier information is transmitted to a transmission object on the basis of the carrier information acquired from the communication control apparatus 200.

More specifically, the information processing apparatus 100 controls the timing at which the acquired carrier information is transmitted to the transmission object, for example, when the carrier information (first carrier information) indicating that no carrier is detected is acquired. Also, the information processing apparatus 100 does not transmit the carrier information indicating that no carrier is detected to the transmission object when carrier information (second carrier information) indicating that the carrier is detected is acquired, for example, before the carrier information indicating that no carrier is detected is transmitted to the transmission object.

Here the carrier information according to the present embodiment is data indicating that the carrier is detected or data indicating that no carrier is detected. That is, the carrier information according to the present embodiment is data indicating whether the carrier is detected. The carrier information according to the present embodiment includes data related to an event notification, for example, such as "EVT_FIELD_ON" (an example of data indicating that the carrier is detected) or "EVT_FIELD_OFF" (an example of data indicating that no carrier is detected).

Also, the carrier information according to the present embodiment is not limited to the above-described example. For example, the carrier information according to the present embodiment includes data having any format capable of indicating that no carrier is detected such as a flag indicating whether the carrier is detected.

Also, the transmission object according to the present embodiment executes a predetermined process according to carrier information indicating that no carrier is detected to be transmitted by the information processing apparatus 100. As the transmission object according to the present embodiment, a first transmission object shown in the following (a) and a second transmission object shown in the following (b) can be exemplified.

(a) First Transmission Object

The first transmission object has a function of holding, when the execution of a process related to another communication interface except for the contactless communication is requested while a process related to the contactless communication is performed, the execution of the process related to the other communication interface until the process related to the contactless communication being performed is terminated. Here, the above-described function provided in the first transmission object corresponds to the above-described "Continuous Processing" function. That is, the first transmission object according to the present embodiment has the "Continuous Processing" function.

Also, the first transmission object performs a "process of executing the process related to the other communication interface for which execution is held by determining that the process related to the contactless communication is terminated on the basis of the carrier information indicating that no carrier is detected" as the predetermined process according to the carrier information indicating that no carrier is detected. That is, the first transmission object releases the "Continuous Processing" function according to the carrier information indicating that no carrier is detected to be transmitted. Here, the first transmission object performs a process of a command according to the contactless communication until the end if the command related to the contactless communication is processed, for example, when the carrier information indicating that no carrier is detected is acquired, and then determines that the process related to the contactless communication is terminated.

Here, as the first transmission object according to the present embodiment, for example, a first processing unit (to be described below) provided in the information processing apparatus 100 can be exemplified.

The first processing unit (to be described below) performs a process based on various types of signals transmitted from the external apparatus 500, for example, transmitted from the communication control apparatus 200 through HCI and SWP illustrated in FIG. 1. As the process based on various types of signals transmitted from the external apparatus 500, data processing of data transmitted from the communication control apparatus 200 or data stored in a recording medium such as a flash memory based on a processing request transmitted from the communication control apparatus 200 can be exemplified.

Also, the first processing unit (to be described below), for example, causes a response signal to be transmitted according to a processing result to the communication control apparatus 200 and causes the communication control apparatus 200 to transmit the response signal to the external apparatus. Here, the first processing unit (to be described below), for example, causes a communication interface provided in the information processing apparatus 100 or an external communication interface connected to the information processing apparatus 100 to transmit the response signal to the communication control apparatus 200.

Also, the first processing unit (to be described below) performs a process based on various types of signals transmitted from the processing apparatus 400 through a communication interface, for example, based on the ISO7816 standard illustrated in FIG. 1, as the process related to another communication interface in addition to the contactless communication. As the process based on various types of signals transmitted from the processing apparatus 400, data processing of data transmitted from the processing apparatus 400 or data stored in a recording medium based on a processing request transmitted from the processing apparatus 400 can be exemplified.

When the execution of a process related to another communication interface except for the contactless communication is requested while a process related to the contactless communication is performed, the first processing unit (to be described below) holds the execution of the process related to the other communication interface until the process related to the contactless communication being performed is terminated. The first processing unit (to be described below) determines that the process related to the contactless communication is terminated on the basis of the carrier information indicating that no carrier is detected when the carrier information indicating that no carrier is detected is transmitted and executes the process related to the other communication interface for which execution is held.

The information processing apparatus 100 controls a release timing of the "Continuous Processing" function in the first processing unit (to be described below) by performing a process of controlling the timing at which the carrier information indicating that no carrier is detected is transmitted to the first processing unit (to be described below) as the process related to the information processing method according to the present embodiment. Consequently, the information processing apparatus 100 can continue the process related to the contactless communication by controlling the timing at which the carrier information indicating that no carrier is detected is transmitted to the first processing unit (to be described below) even when instantaneous interruption is caused.

Also, the first transmission object according to the present embodiment is not limited to the first processing unit (to be described below) provided in the information processing apparatus 100. For example, the first transmission object according to the present embodiment may be an external apparatus having a similar function to the first processing unit (to be described below). Also, a plurality of first transmission objects according to the present embodiment, for example, such as the first processing unit (to be described below) and the external apparatus having a similar function to the first processing unit (to be described below), may be provided. For example, in the information processing system 1000 illustrated in FIG. 1, the information processing apparatus 100 and/or the processing apparatus 400 can be exemplified as the first transmission object according to the present embodiment.

(b) Second Transmission Object

The second transmission object performs the process related to the contactless communication by executing an application. As the process related to the contactless communication to be performed by the second transmission object, a process similar to the process related to the contactless communication in the above-described first transmission object can be exemplified.

Here, as the second transmission object according to the present embodiment, the second processing unit (to be described below) provided in the information processing apparatus 100 can be exemplified.

The second processing unit (to be described below) performs a "process of terminating the execution of an application corresponding to the process related to the contactless communication by determining that the process related to the contactless communication is terminated on the basis of the carrier information indicating that no carrier is detected" as a predetermined process according to the carrier information indicating that no carrier is detected. As a specific example of the process of terminating the execution of the application based on the carrier information indicating that no carrier is detected according to the present embodiment, "Deselect of Applet (application)" can be exemplified.

The information processing apparatus 100 controls a termination timing of the execution of the application corresponding to the process related to the contactless communication in the second processing unit (to be described below) by performing the process of controlling the timing at which the carrier information indicating that no carrier is detected is transmitted to the second processing unit (to be described below) as the process related to the information processing method according to the present embodiment.

Here, for example, when instantaneous interruption is caused, the execution of the application is terminated as in "Deselect of Applet in the case in which no carrier is detected" defined in the above-described Non-Patent Literature 1. Also, when the temporarily terminated application is re-executed thereafter, the execution of the application is time-consuming.

Consequently, if the temporarily terminated application is re-executed when the instantaneous interruption is caused, there is a problem in that the transmission of the response signal according to a processing result of the process related to the contactless communication is delayed. Also, when the transmission of the response signal to the external apparatus 500 is delayed, the time-out of the process in the external apparatus 500 can occur and the contactless communication cannot continue as a result.

On the other hand, the information processing apparatus 100 can control the termination timing of the execution of the application corresponding to the process related to the contactless communication in the second processing unit (to be described below) according to the process related to the information processing method according to the present embodiment. Consequently, the information processing apparatus 100 can prevent the contactless communication from being non-continuous, for example, when the time-out of the process in the external apparatus 500 occurs as described above.

Therefore, the information processing apparatus 100 can continue the process related to the contactless communication by controlling the timing at which carrier information indicating that no carrier is detected is transmitted to the second processing unit (to be described below) even when instantaneous interruption is caused.

Also, the second transmission object according to the present embodiment is not limited to the second processing unit (to be described below) provided in the information processing apparatus 100. For example, the second transmission object according to the present embodiment may be an external apparatus having a similar function to the first processing unit (to be described below). Also, a plurality of second transmission objects according to the present embodiment, for example, such as the second processing unit (to be described below) and the external apparatus having a similar function to the second processing unit (to be described below), may be provided. For example, in the information processing system 1000 illustrated in FIG. 1, the information processing apparatus 100 and/or the processing apparatus 400 can be exemplified as the second transmission object according to the present embodiment.

As the transmission object according to the present embodiment, the first transmission object shown in the above-described (a) and the second transmission object shown in the above-described (b) can be exemplified. Also, the transmission object according to the present embodiment is not limited to the above-described first transmission object and the above-described second transmission object. For example, the transmission object according to the present embodiment may have both a function provided in the above-described first transmission object and a function provided in the above-described second transmission object.

When carrier information indicating that no carrier is detected from the communication control apparatus 200 is acquired as described above, the information processing apparatus 100 controls the timing at which the acquired carrier information is transmitted to the transmission object.

Also, the process in the information processing apparatus 100 is not limited to the above-described process.

For example, the information processing apparatus 100 causes information related to a processing time to be transmitted to the communication control apparatus 200. The information processing apparatus 100 causes a communication interface provided in the apparatus itself (the information processing apparatus 100; the same hereinafter) or an external communication interface connected to the information processing apparatus 100 to transmit the information related to the processing time to the communication control apparatus 200. The information related to the processing time according to the present embodiment is transmitted, for example, at the time of responding to a polling signal.

Here, the information related to the processing time according to the present embodiment is data indicating an estimate of a processing time when the process is performed. As the information related to the processing time according to the present embodiment, data indicating a parameter called "PMm" including a maximum response time parameter indicating a maximum response time can be exemplified.

The information related to the processing time according to the present embodiment is used to calculate a waiting time (time-out time) of the process in the external apparatus 500. The waiting time of the process is calculated on the basis of the information related to the processing time according to the present embodiment in the external apparatus 500, so that the external apparatus 500 can output an error or proceed to the next process according to the waiting time of a process suitable for the information processing apparatus 100. Consequently, the information processing apparatus 100 causes the information related to the processing time to be transmitted to the communication control apparatus 200, so that the process related to the contactless communication between the information processing system 1000 and the external apparatus 500 is more smoothly performed.

Also, the information related to the processing time according to the present embodiment is not limited to PMm and may be, for example, any data capable of being used in a process related to setting of the waiting time in the external apparatus 500. Also, in the present embodiment, the waiting time may be previously shared between the information processing system 1000 and the external apparatus 500 rather than the exchange of data such as the information related to the processing time being performed as necessary, or a specified time may be predetermined between the information processing system 1000 and the external apparatus 500. Even when the waiting time is previously shared or the above-described specified time is predetermined, the process related to the contactless communication between the information processing system 1000 and the external apparatus 500 can be smoothly performed. Hereinafter, an example in which the information related to the processing time according to the present embodiment is PMm is shown.

[1-2] Overview of Communication Control Apparatus 200

The communication control apparatus 200 performs contactless communication with the external apparatus 500. For example, the communication control apparatus 200 performs the contactless communication with the external apparatus 500 by receiving a signal transmitted from the external apparatus 500 via the connected antenna 300, performing load modulation, and transmitting a signal via the antenna 300. As the antenna 300, for example, an inductor having predetermined inductance can be exemplified.

Also, the communication control apparatus 200 communicates with the information processing apparatus 100 via communication interfaces such as the HCI and the SWP.

The communication control apparatus 200 causes various types of signals transmitted from the external apparatus 500, for example, transmitted via the antenna 300, to be transmitted to the information processing apparatus 100.

Also, the communication control apparatus 200 determines whether the carrier is detected and causes carrier information according to a determination result to be transmitted to the information processing apparatus 100.

Here, the communication control apparatus 200 determines that no carrier is detected, for example, when a voltage induced in the antenna 300 according to the carrier is not detected for a set predetermined time or more (or when the voltage is not detected for a time longer than the predetermined time). Also, the communication control apparatus 200 determines that the carrier is detected, for example, when the voltage induced in the antenna 300 according to the carrier is detected within the set predetermined time (or when the voltage is detected within the predetermined time). Also, of course, the process related to the determination of whether the carrier is detected in the communication control apparatus 200 is not limited to the above-described example.

In FIG. 1, the example in which the communication control apparatus 200 performs the contactless communication with the external apparatus 500 via the connected antenna 300 is illustrated. However, the communication control apparatus 200 may include the antenna 300.

[1-3] Overview of Processing Apparatus 400

The processing apparatus 400 includes a processor that includes a micro processing unit (MPU) or various processing circuits and performs various processes. As the processes performed by the processing apparatus 400, for example, a process in conjunction with the information processing apparatus 100 through communication, a process related to the communication with the communication control apparatus 200, and a process that the processing apparatus 400 performs by itself can be exemplified.

The information processing system 1000 has, for example, the configuration illustrated in FIG. 1.

The configuration of the information processing system according to the embodiment is not limited to the example illustrated in FIG. 1.

Figure 2:
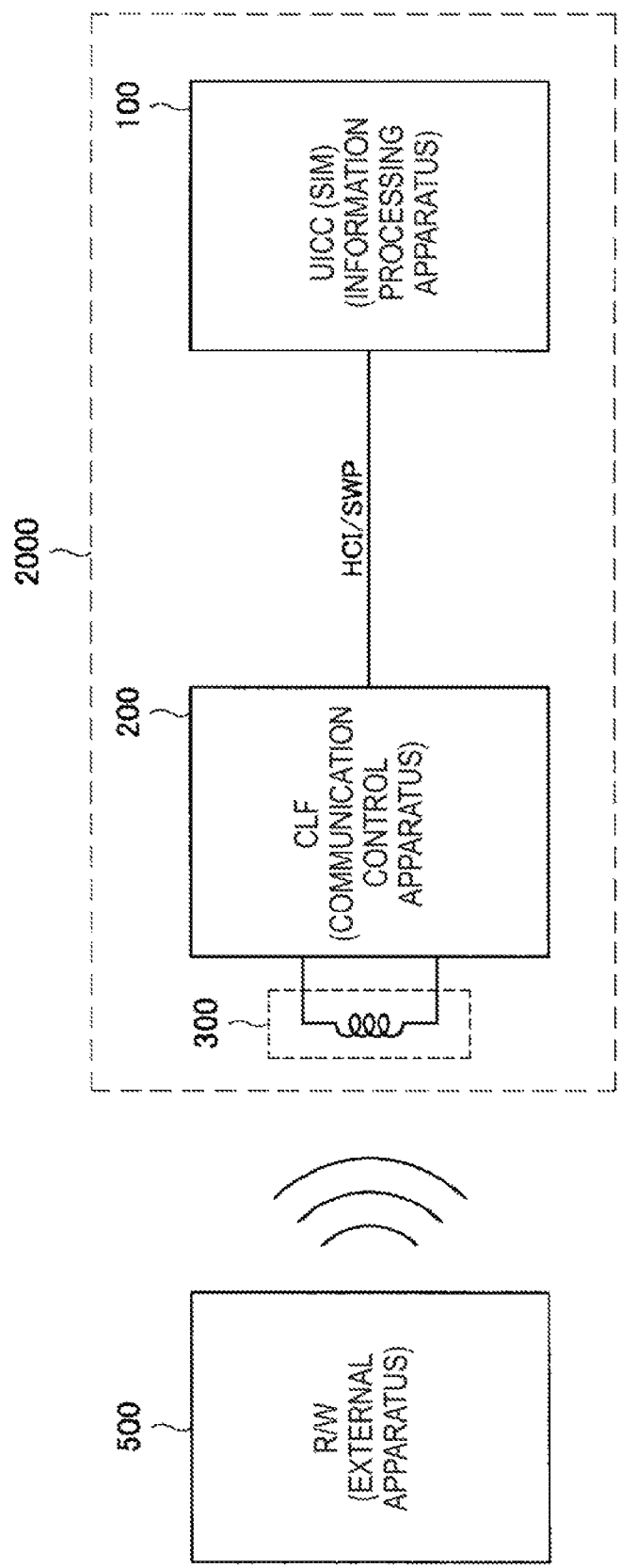
FIG. 2 is an explanatory diagram illustrating an example of the configuration of an information processing system according to the present embodiment according to another example.

FIG. 2 is an explanatory diagram illustrating an example of the configuration of an information processing system 2000 according to the present embodiment according to another example. For example, as in the information processing system 2000 illustrated in FIG. 2, it may be unnecessary for the information processing system according to the present embodiment to have the processing apparatus 400.

When there is no other communication interface in addition to a communication interface related to contactless communication between the information processing apparatus 100 and the communication control apparatus 200 as in the information processing system 2000 illustrated in FIG. 2, the "Continuous Processing" function does not work even when the information processing apparatus 100 has the "Continuous Processing" function. Thus, when there is no other communication interface in addition to the communication interface related to the contactless communication as in the information processing system 2000, it may be unnecessary for the information processing apparatus 100 to perform a process of controlling the timing at which the acquired carrier information is transmitted to the first transmission object described above.

The configuration of the information processing system according to the embodiment is not limited to the example illustrated in FIG. 1 or FIG. 2.

The information processing system according to the embodiment may be, for example, an apparatus in which the communication control apparatus 200 and the processing apparatus 400 illustrated in FIG. 1 are integrated.

The information processing system according to the embodiment may be, for example, an apparatus in which the information processing apparatus 100, the communication control apparatus 200, and the antenna 300 illustrated in FIG. 1 and FIG. 2 are integrated. When the information processing system is the apparatus in which the information processing apparatus 100, the communication control apparatus 200, and the antenna 300 are integrated, the integrated apparatus is referred to as, for example, a "microSD" in some cases. Here, "micro" is a size of a shape, but the size is not necessarily uniquely designated and is not limited to various types of standards including an SD card.

For example, the information processing system according to the embodiment may have a configuration in which the information processing apparatus 100 illustrated in FIG. 1 is internally included in the processing apparatus 400. When the information processing apparatus 100 is configured to be internally included in the processing apparatus 400, the information processing apparatus 100 is referred to as, for example, a trusted execution environment (TEE) in some cases.

For example, the information processing system according to the embodiment may have a configuration in which the information processing apparatus 100, the communication control apparatus 200, and the processing apparatus 400 illustrated in FIG. 1 are integrated, that is, may have a configuration in which the information processing system according to the embodiment is a single apparatus.

When the information processing system according to the embodiment has, for example, any of the several configurations described above, the information processing apparatus 100 (or an apparatus corresponding to the information processing apparatus 100) included in the information processing system according to the embodiment can perform a process related to the information processing method according to the embodiment to be described below. Accordingly, when the information processing system according to the embodiment has, for example, any of the several configurations described above, it is possible to continue a process related to contactless communication.

In the information processing system according to the embodiment, the information processing apparatus 100 can also be detachably mounted. When the information processing apparatus 100 can be detachably mounted, the information processing apparatus 100 is referred to as, for example, a "UICC" in some cases. When the information processing apparatus 100 may not be detachably mounted, the information processing apparatus 100 is referred to as, for example, an "eUICC" in some cases. For example, when the information processing system according to the embodiment is a communication apparatus such as a mobile phone and the information processing apparatus 100 does not store information necessary for connection with a general public wireless line, the information processing apparatus 100 is referred to as, for example, an "eSE" in some cases. When the information processing apparatus 100 can be detachably mounted, the information processing apparatus 100 can perform the process related to the information processing method according to the embodiment to be described below, for example, in the information processing system according to any embodiment on which the information processing apparatus 100 is mounted. In more detail, when the information processing apparatus 100 is combined with the communication control apparatus 200 according to any kind of embodiment, the information processing apparatus 100 can perform the process related to the information processing method according to the embodiment to be described below. Accordingly, even when the information processing apparatus 100 can be detachably mounted, it is possible to continue a process related to contactless communication.

[2] Process Related to Information Processing Method According to Embodiment

Next, the process related to the information processing method according to the embodiment will be described. Hereinafter, a case in which the information processing apparatus 100 according to the embodiment included in the information processing system 1000 illustrated in FIG. 1 performs the process related to the information processing method according to the embodiment will be exemplified. Hereinafter, the information processing apparatus 100 is referred to as a "UICC," the communication control apparatus 200 is referred to as a "CLF," and the external apparatus 500 is referred to as an "R/W" in some cases. As described above, the information processing apparatus 100 is not limited to the "UICC." The communication control apparatus 200 and the external apparatus 500 are not limited to the "CLF" and "R/W" either.

Also, hereinafter, an example in which the transmission object (for example, the first transmission object or the second transmission object) according to the present embodiment is a component (for example, the first processing unit or the second processing unit) provided in the apparatus itself is shown.

FIG. 3 is an explanatory diagram illustrating an example of a situation in which instantaneous interruption is caused. In FIG. 3, a reader/writer 10 for outputting a magnetic field (carrier) of a predetermined frequency and an information processing system 20 capable of performing contactless communication with the reader/writer 10 using the magnetic field are illustrated. Here, in FIG. 3, a portable phone is illustrated as the information processing system 20.

An RF magnetic field output by the reader/writer 10 does not constantly extend in a semicircle state. For example, as shown in a region A or a region B illustrated in FIG. 3, there is a region in which there is no RF magnetic field or contactless communication cannot be performed for an RF magnetic field intensity which is not operable in the information processing system 20. Thus, if the case in which the information processing system 20 moves along a path P illustrated in FIG. 3 is considered, instantaneous interruption is caused between the reader/writer 10 and the information processing system 20 when the information processing system 20 is positioned in the region A or B of FIG. 3. Here, the instantaneous interruption is likely to occur, for example, in units of 30 [ms] to 50 [ms].

Here, when the instantaneous interruption is caused, the contactless communication is not performed and the information processing system 20 determines that the process related to the contactless communication is terminated. Thus, even when the information processing system 20 enters the RF magnetic field again as indicated by P of FIG. 3, the information processing system 20 cannot continue the process related to the contactless communication.

Also, when the information processing system 20 has the "Continuous Processing" function, a process related to another communication interface which is held may be executed. Consequently, when the information processing system 20 has the "Continuous Processing" function, the information processing system 20 cannot continue the process related to the contactless communication even when the information processing system 20 enters the RF magnetic field again.

Also, the reader/writer 10 calculates a waiting time (timeout time) of a process using PMm included in the response signal to be transmitted from the information processing system 20, for example, for a transmitted polling signal. Because the reader/writer 10 can output an error or proceed to the next process according to the waiting time of a process suitable for the information processing system 20, the process related to the contactless communication is more smoothly performed between the reader/writer 10 and the information processing system 20.

Here, when the information processing system 20 has the "Continuous Processing" function and executes the process related to another communication interface by instantaneous interruption, the transmission of the response signal from the information processing system 20 to the reader/writer 10 is delayed according to the execution of the process related to the other communication interface. Also, when the transmission of the response signal from the information processing system 20 is delayed, the unnecessary timeout is likely to occur in the reader/writer 10. Also, when a value of PMm increases to reduce a possibility of occurrence of the above-described unnecessary timeout, it is not possible to expect the optimization of the process related to the contactless communication between the reader/writer 10 and the information processing system 20.

Therefore, in the information processing system according to the present embodiment, the information processing apparatus 100 continues the process related to the contactless communication, for example, by performing (1) timing control process to be described below.

(1) Timing Control Process

When the carrier information (first carrier information) indicating that no carrier is detected is acquired from the communication control apparatus 200, the information processing apparatus 100 controls the timing at which the acquired carrier information is transmitted to the transmission object (for example, the first transmission object or the second transmission object) according to the present embodiment.

More specifically, the information processing apparatus 100 transmits the carrier information to the transmission object according to the present embodiment when the set waiting time has elapsed from the acquisition of the carrier information indicating that no carrier is detected. Also, when the carrier information (second carrier information) indicating that the carrier is detected is acquired before the set waiting time has elapsed, the information processing apparatus 100 does not transmit the carrier information indicating that no carrier is detected to the transmission object.

As the waiting time according to the present embodiment, for example, one common time in the application related to the execution of the process related to the contactless communication can be exemplified. For example, the waiting time according to the present embodiment may be preset or set at a timing similar to the set time related to an existing "Continuous Processing" function.

When the waiting time according to the present embodiment is one time, the information processing apparatus 100 uses the one time as the waiting time regardless of the application related to the execution of the process related to the contactless communication.

Here, the application related to the execution of the process related to the above-described contactless communication is executed, for example, in a transmission object according to the present embodiment. That is, the application related to the execution of the process related to the above-described contactless communication may be an application to be executed in the information processing apparatus 100 or an application to be executed in the external apparatus.

Also, the waiting time according to the present embodiment is not limited to the above description. For example, the waiting time according to the present embodiment may be set for every application related to the execution of the process related to contactless communication. The waiting time for every application is set, for example, when the application is installed. Also, the waiting time for every application may be set, for example, at the similar timing to the set time according to the existing "Continuous Processing" function.

When the waiting time according to the present embodiment is set for every application in the present embodiment, the information processing apparatus 100 uses the waiting time set for the application related to the execution of the process related to the contactless communication, that is, the application for use in the contactless communication. Here, when the application related to the execution of the process related to the contactless communication is executed in the external apparatus which is the transmission object, the information processing apparatus 100 specifies the waiting time set for the application by acquiring identification information (for example, an application ID or the like) of the application from the external apparatus.

Hereinafter, an example of a timing control process according to the present embodiment will be described. Also, hereinafter, the process of transmitting the carrier information indicating that no carrier is detected to the transmission object according to the present embodiment in the timing control process according to the present embodiment will be mainly described.

(1-1) First Example of Timing Control Process

The information processing apparatus 100 specifies a waiting time to be set using setting information stored in the recording medium, for example, such as a non-volatile memory such as a read only memory (ROM) or a flash memory. The information processing apparatus 100 transmits the carrier information to the transmission object according to the present embodiment when the set waiting time has elapsed from the acquisition of the carrier information indicating that no carrier is detected.

Here, the information processing apparatus 100 specifies the waiting time, for example, when the carrier information indicating that no carrier is detected is acquired. Also, the information processing apparatus 100 may specify the waiting time regardless of the timing at which the carrier information indicating that no carrier is detected is acquired, for example, at the startup time.

As the setting information according to the present embodiment, data obtained by extending data in which the set time according to the existing "Continuous Processing" function is specified can be exemplified.

FIGS. 4 and 5 are explanatory diagrams for describing an example of setting information according to the present embodiment. FIG. 4 illustrates an example of a specification for setting a set time according to the existing "Continuous Processing" function defined in the above-described Non-Patent Literature 1. Also, FIG. 5 illustrates an example of a specification for setting a waiting time according to the present embodiment.

In the data in which the set time according to the existing "Continuous Processing" function is specified, the set time is specified by 2 [bytes] as an execution environment (OPEN), for example, as illustrated in A of FIG. 4. In the data in which the set time according to the existing "Continuous Processing" function is specified, whether each application to be executed in the execution environment corresponds to the "Continuous Processing" function is specified by 1 [byte], for example, as illustrated in B of FIG. 4.

In the setting information according to the present embodiment, for example, the waiting time according to the present embodiment is further specified by 2 [bytes] as illustrated in FIG. 5, for example, in addition to data illustrated in A of FIG. 4 and B of FIG. 4. Also, the waiting time according to the present embodiment is not limited to that specified by 2 [bytes], and may be specified by data having any data size capable of indicating the waiting time.

Also, the setting information according to the present embodiment is not limited to data obtained by extending the data in which the set time according to the existing "Continuous Processing" function is specified. For example, the setting information according to the present embodiment may be data in which the waiting time according to the present embodiment is specified as illustrated in FIG. 5.

Also, when the waiting time according to the present embodiment is set for every application according to the execution of the process related to the contactless communication, the setting information according to the present embodiment may be, for example, data in which an application and a waiting time according to the present embodiment are associated for every application such as data of a table format or a database.

(1-2) Second Example of Timing Control Process

The information processing apparatus 100 resets, for example, the set waiting time, and transmits the carrier information to the transmission object according to the present embodiment when the reset waiting time has elapsed from the acquisition of the carrier information indicating that no carrier is detected.

More specifically, the information processing apparatus 100 resets the waiting time so that the waiting time does not exceed the time corresponding to the information related to the processing time, for example, when the set waiting time is longer than a time corresponding to the information related to the processing time according to the present embodiment such as PMm. Here, as the time corresponding to the information related to the processing time according to the present embodiment, for example, a value equal to or less than the maximum value of a maximum response time parameter indicating a maximum response time included in PMm can be exemplified.

As described above, the information related to the processing time according to the present embodiment such as PMm is used in calculation of the waiting time (time-out time) of the process in the external apparatus 500. Thus, when the set waiting time is longer than the time corresponding to the information related to the processing time according to the present embodiment, the time-out of the process in the external apparatus 500 occurs before the waiting time related to the transmission of the carrier information has elapsed and consequently it is not possible to continue the process related to the contactless communication.

Also, the case in which the external apparatus 500 initializes the application related to the execution of the process related to the contactless communication to be executed at the information processing system side according to the present embodiment, for example, when the external apparatus 500 temporarily stops the output of the RF magnetic field, is also considered. At this time, when the set waiting time is long and exceeds the time corresponding to the information related to the processing time according to the present embodiment, the possibility of the above-described initialization being interfered with increases.

Therefore, the information processing apparatus 100 resets the set waiting time on the basis of the information related to the processing time according to the present embodiment as described above. The information processing apparatus 100 can reduce the possibility of the above-described initialization being interfered with by performing resetting on the basis of the information related to the processing time according to the present embodiment as described above.

The information processing apparatus 100 resets the waiting time, for example, when the carrier information indicating that no carrier is detected is acquired. Also, the information processing apparatus 100 may reset the waiting time, for example, when the carrier information indicating that no carrier is detected while a command related to contactless communication is executed. Also, the information processing apparatus 100 can reset the waiting time, for example, regardless of the timing at which the carrier information indicating that no carrier is detected at the startup time.

(1-3) Third Example of Timing Control Process

The information processing apparatus 100 transmits the carrier information indicating that no carrier is detected to the transmission object according to the present embodiment, for example, regardless of the set waiting time on the basis of a signal or information acquired from the communication control apparatus 200.

More specifically, the information processing apparatus 100 transmits the carrier information indicating that no carrier is detected to the transmission object according to the present embodiment regardless of a set waiting time, for example, when a signal of a predetermined pattern is acquired from the communication control apparatus 200 or when information for designating an absent application is acquired from the communication control apparatus 200. Here, the absent application according to the present embodiment is, for example, an application which is not stored in a storage unit (to be described below) provided in the information processing apparatus 100 or an external storage medium connected to the information processing apparatus 100.

Here, as the signal of the predetermined pattern according to the present embodiment, a combination of whether the carrier is detected such as <"EVT_FIELD_OFF," "EVT_FIELD_ON," "EVT_FIELD_OFF," "EVT_FIELD_ON," "EVT_FIELD_OFF"> can be exemplified. The signal of the predetermined pattern according to the present embodiment is transmitted from the communication control apparatus 200 to the information processing apparatus 100, for example, when the external apparatus 500 turns on/off the output of the RF magnetic field.

Also, the signal of the predetermined pattern according to the present embodiment is not limited to the above-described example. For example, the signal of the predetermined pattern according to the present embodiment may be a signal of any pattern capable of being recognized by the information processing apparatus 100 such as <"EVT_FIELD_OFF," "EVT_FIELD_ON (for a predetermined time such as a time of 10[%] of the set waiting time)," "EVT_FIELD_OFF">.

When a process related to contactless communication between the external apparatus 500 and the information processing system according to the present embodiment is terminated and the external apparatus 500 turns off the output of the RF magnetic field based on the fact that there is no next command to be transmitted, it is unnecessary to set the waiting time related to the transmission of the carrier information due to the fact that the process related to the contactless communication is terminated. Also, when the carrier information indicating that no carrier is detected after the waiting time has elapsed is transmitted to the transmission object according to the present embodiment, for example, the time until the "Continuous Processing" function is released is delayed by a set waiting time.

Therefore, the information processing apparatus 100 transmits the carrier information indicating that no carrier is detected to the transmission object according to the present embodiment regardless of the set waiting time on the basis of the signal or information acquired from the communication control apparatus 200, for example, as described above. The information processing apparatus 100 can prevent an unnecessary waiting time from being provided, for example, at the time of intentional disconnection of contactless communication rather than instantaneous interruption, by transmitting the carrier information indicating that no carrier is detected to the transmission object according to the present embodiment regardless of the above-described set waiting time.

(1-4) Fourth Example of Timing Control Process

The information processing apparatus 100 can also perform, for example, a process in which the timing control process according to the first example shown in the above-described (1-1) to the timing control process according to the third example shown in the above-described (1-3) are combined.

In the information processing system according to the present embodiment, the information processing apparatus 100 continues the process related to the contactless communication even when instantaneous interruption is caused by performing the above-described (1) process (timing control process) as the process related to the information processing method according to the present embodiment.

Here, for example, the following method is considered as another method of continuing the process related to the contactless communication in the information processing system according to the present embodiment.

The communication control apparatus 200 transmits the carrier information (first carrier information) indicating that no carrier is detected when the set waiting time has elapsed after determining that no carrier was detected to the information processing apparatus 100. When it is determined that the carrier is detected before the set waiting time has elapsed, the communication control apparatus 200 transmits the carrier information (second carrier information) indicating that the carrier is detected to the information processing apparatus 100 without transmitting the carrier information indicating that no carrier is detected.

As the waiting time set in the communication control apparatus 200, a waiting time set for every type of NFC such as Type A, Type B, or Type F and a common waiting time regardless of the type of NFC can be exemplified.

When the communication control apparatus 200 does not determine that the carrier has been detected before the set waiting time has elapsed after determining that no carrier was detected as described above, the carrier information indicating that no carrier is detected is transmitted to the information processing apparatus 100, so that the information processing apparatus 100 does not acquire the carrier information indicating that no carrier is detected, for example, even when the instantaneous interruption is caused. Consequently, there is a possibility of continuation of the process related to the contactless communication even when another method of continuing the process related to the contactless communication is used in the information processing system according to the above-described embodiment.

On the other hand, in the process related to the information processing method according to the above-described embodiment, the information processing apparatus 100 capable of performing the process based on various types of signals transmitted from the external apparatus 500 performs the above-described (1) process (timing control process). The information processing apparatus 100 can find, for example, a state of the process related to the contactless communication, an application for use in the process related to the contactless communication, or the like. Consequently, the information processing apparatus 100 performs the process related to the information processing method according to the above-described present embodiment, so that the information processing apparatus 100 can set a more appropriate waiting time than when the process related to another method of continuing the process related to the above-described contactless communication is performed.

Also, the information processing apparatus 100 can set the waiting time regardless of the type of NFC corresponding to the connected communication control apparatus according to the present embodiment, for example, even when the communication control apparatus according to the present embodiment connected to the information processing apparatus 100 changes, by performing the above-described (1) process (timing control process).

Also, the process related to the information processing method according to the present embodiment is not limited to the above-described (1) process (timing control process). For example, the information processing apparatus 100 can further perform the following execution process as the process related to the information processing method according to the present embodiment.

(2) Execution Process

The information processing apparatus 100 executes a predetermined process according to the carrier information (first carrier information) indicating that no carrier is detected to be transmitted according to the above-described (1) process (timing control process).

Here, as the predetermined process in the execution process according to the present embodiment, a predetermined process in the above-described first transmission object and a predetermined process in the above-described second transmission object can be exemplified.

(Information Processing Apparatus According to Embodiment)

Next, an example of the configuration of the information processing apparatus according to the embodiment capable of performing the process related to the information processing method according to the above-described embodiment will be described.

Figure 6:
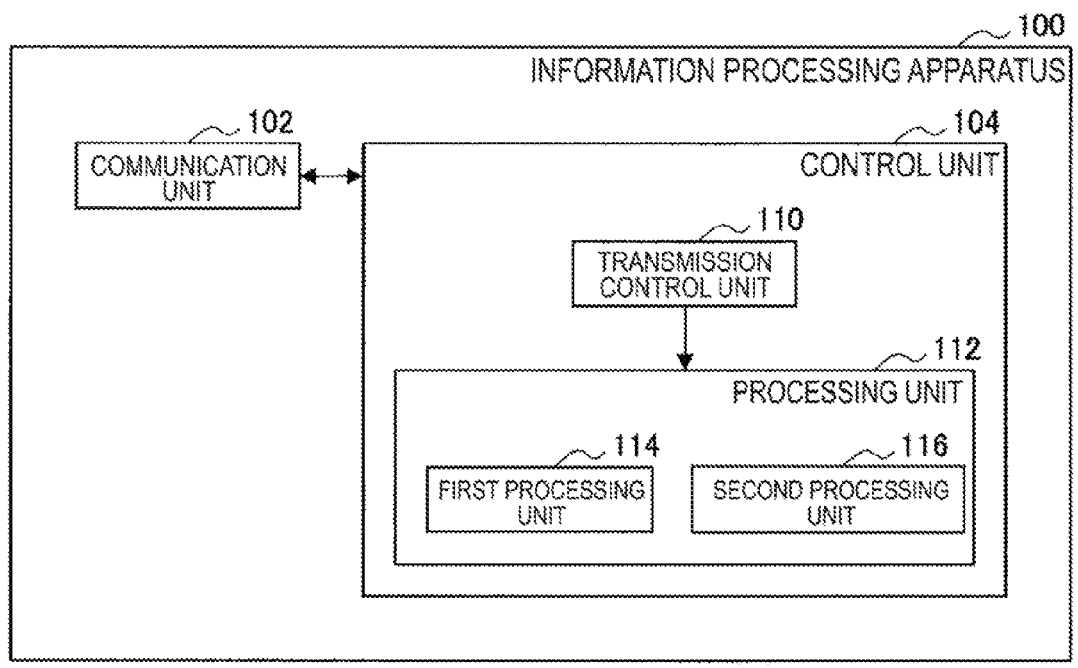
FIG. 6 is a block diagram illustrating an example of the configuration of an information processing apparatus according to the embodiment.

FIG. 6 is a block diagram illustrating an example of the configuration of the information processing apparatus 100 according to the embodiment. The information processing apparatus 100 includes, for example, a communication unit 102 and a control unit 104.

The information processing apparatus 100 may include, for example, a read-only memory (ROM) (not illustrated), a random access memory (RAM) (not illustrated), and a storage unit (not illustrated). In the information processing apparatus 100, for example, the constituent elements are connected by a bus serving as a data transmission path. Also, the information processing apparatus 100 is driven by obtaining power from a battery such as a provided secondary battery or an external power supply.

Here, the ROM (not illustrated) stores programs used by the control unit 104 or control data such as calculation parameters. The RAM (not illustrated) temporarily stores programs executed by the control unit 104.

The storage unit (not illustrated) stores various kinds of data such as the data related to the information processing method according to the embodiment, such as the setting information, the applications, or the like. Here, as the storage unit (not illustrated), for example, a recording medium such as a nonvolatile memory can be exemplified. For example, the storage unit (not illustrated) may be a recording medium having a tamper-resistant property or may be detachably mounted on the information processing apparatus 100.

[Example of Hardware and Software Configurations of Information Processing Apparatus 100]

Figure 7:
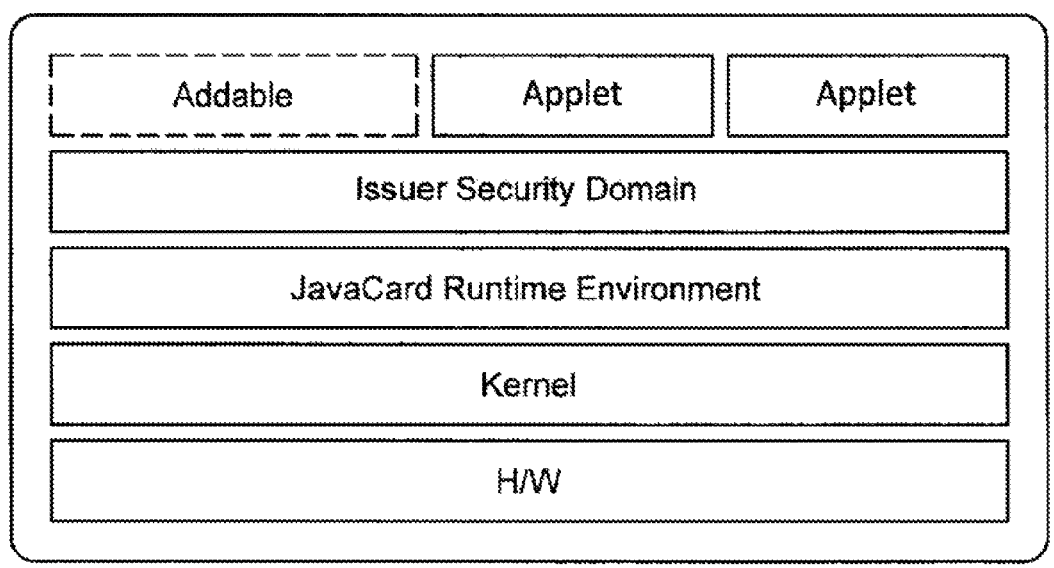
FIG. 7 is an explanatory diagram illustrating examples of hardware and software configurations of the information processing apparatus according to the embodiment.

FIG. 7 is an explanatory diagram illustrating examples of the hardware and software configurations of the information processing apparatus 100 according to the embodiment.

The hardware ("H/W" illustrated in FIG. 7) included in the information processing apparatus 100 is configured to include a processor (not illustrated) including an MPU or various processing circuits, a ROM (not illustrated), a RAM (not illustrated), a recording medium (not illustrated), and a communication interface (not illustrated).

The processor (not illustrated) functions as the control unit 104 controlling the entire information processing apparatus 100. The processor (not illustrated) executes software constituting the information processing apparatus 100. In the information processing apparatus 100, the processor (not illustrated) serves as, for example, the transmission control unit 110 and a processing unit 112 to be described below.

The communication interface (not illustrated) functions as the communication unit 102 performing communication with another constituent element, such as the communication control apparatus 200 or the processing apparatus 400, included in the information processing system according to the embodiment. As the communication interface (not illustrated), for example, a communication interface related to HCI and SWP or a communication interface based on the ISO7816 standard including an universal serial bus (USB) can be exemplified. The communication interface (not illustrated) may be a communication device using any scheme capable of performing communication with another constituent element included in the information processing system according to the embodiment. The information processing apparatus 100 can include one or two or more communication interfaces (not illustrated). As such an interface, for example, an interface for a SD card or a high-definition multimedia interface (HDMI) (registered trademark) can be exemplified.

As the software included in the information processing apparatus 100, as illustrated in FIG. 7, for example, a kernel (a kernel illustrated in FIG. 7), "Java Card Runtime Environment," "Issuer Security Domain," and various applications (applets illustrated in FIG. 7) can be exemplified. An application included in the software included in the information processing apparatus 100 can also be added as illustrated as Addable in FIG. 7. An application constituting software constituting the information processing apparatus 100 may be erasable.

Here, an example of software constituting the information processing apparatus 100 illustrated in FIG. 7 and a relationship between the software constituting the information processing apparatus 100 illustrated in FIG. 7 and the configuration of the information processing apparatus 100 according to the present embodiment illustrated in FIG. 6 will be described.

For example, the communication unit 102 is implemented by mounting a communication protocol such as SWP in the kernel and "Java Card Runtime Environment" is notified of information of EVT_FIELD_ON or EVT_FIELD_OFF.

"Java Card Runtime Environment" has a JavaCard virtual machine (VM) for interpreting the Java (registered trademark) language and has a function of executing the program. A Java Card function specified in Java Card Fourm is provided, so that a plurality of programs are managed as an Applet and a switching function is appropriately provided.

The transmission control unit 110 or the processing units 112 (the first processing unit 114 and the second processing unit 116 to be described below) are implemented in the kernel or the "Java Card Runtime Environment" part and described in a machine language (also referred to as Native) for fast implementation on a processor in general.

On the other hand, an Applet operable in the VM on "Java Card Runtime Environment" can be described in an intermediate language such as Java (registered trademark) to take advantage of a downloadable property on any information processing apparatus and generally operated on the VM.

"Issuer Security Domain" is logically located on "Java Card Runtime Environment" and plays a role in managing various types of rights and a card state in place of an issuer as a manager when an Applet is installed. Also, "Issuer Security Domain" is equipped with a key value and an authentication algorithm, for example, to confirm whether various types of rights are possessed. Because at least one "Issuer Security Domain" is located in the information processing apparatus, a method of performing implementation in a machine language in advance can be implemented at a high speed. A security domain for assisting "Issuer Security Domain" such as a supplementary security domain is normally implemented in the Java (registered trademark) language because its necessity changes according to a condition. As in another Applet, the existence of "Issuer Security Domain" is managed in "Java Card Runtime Environment."

The above-described Continuous Processing function implemented by the processing unit 112 (more specifically, the first processing unit 114 to be described below) is implemented, for example, when "Java Card Runtime Environment" implements time management and interface management and the time is set through "Issuer Security Domain." Because the function is implemented in both "Java Card Runtime Environment" and "Issuer Security Domain" as described above, the two are generally collectively referred to as "OPEN."

When an Applet is installed, a time of the continuous processing individually set by the Applet is also transferred to "Issuer Security Domain" and managed as an argument of a command.

In "Java Card Runtime Environment" receiving event information transferred from the transmission control unit 110, the processing unit 112 (more specifically, the second processing unit 116 to be described below) can control the timing at which carrier information indicating that no carrier is detected is acquired.

The information processing apparatus 100 has, for example, the configuration illustrated in FIG. 7 and performs the process related to the information processing method according to the embodiment. It is needless to say that the hardware and software configuration examples of the information processing apparatus 100 according to the embodiment are not limited to the configuration illustrated in FIG. 7.

Referring back to FIG. 6, an example of the configuration of the information processing apparatus 100 will be described. For example, the communication unit 102 performs communication with each of one or two or more other constituent elements, such as the communication control apparatus 200 and the processing apparatus 400, included in the information processing system according to the embodiment. As the communication unit 102, for example, a communication interface related to HCI and SWP or a communication interface based on the ISO7816 standard including USB can be exemplified.

The control unit 104 is configured to include a processor such as an MPU and serves to control the entire information processing apparatus 100. The control unit 104 includes, for example, a transmission control unit 110 and the processing unit 112 and serves to lead the process related to the information processing method according to the embodiment.

The transmission control unit 110 plays a role in proactively performing the above-described (1) process (timing control process). The transmission control unit 110 transmits the carrier information to the transmission object according to the present embodiment when the set waiting time has elapsed from the acquisition of carrier information (first carrier information) indicating that no carrier is detected from the communication control apparatus 200. Also, the transmission control unit 110 does not transmit the carrier information indicating that no carrier is detected to the transmission object according to the present embodiment when the carrier information (second carrier information) indicating that the carrier is detected is acquired before the waiting time has elapsed.

More specifically, the transmission control unit 110 performs, for example, the timing control process according to the first example shown in the above-described (1-1), the timing control process according to the second example shown in the above-described (1-2), the timing control process according to the third example shown in the above-described (1-3), and the timing control process according to the fourth example shown in the above-described (1-4).

The processing unit 112 has, for example, the first processing unit 114 and the second processing unit 116, and plays a role in proactively performing the above-described (2) process (execution process). The processing unit 112 executes a predetermined process according to the carrier information (first carrier information) indicating that no carrier is detected transmitted from the transmission control unit 110.

The first processing unit 114 serves as the first transmission object according to the present embodiment and performs a predetermined process in the above-described first transmission object on the basis of the carrier information indicating that no carrier is detected transmitted from the transmission control unit 110. The second processing unit 116 serves as the second transmission object according to the present embodiment and performs a predetermined process in the above-described second transmission object on the basis of the carrier information indicating that no carrier is detected transmitted from the transmission control unit 110.

Also, the configuration of the processing unit according to the present embodiment is not limited to the configuration illustrated in FIG. 6. For example, the processing unit according to the present embodiment may be a configuration including one of the first processing unit 114 and the second processing unit 116. Also, one or both of the first processing unit 114 and the second processing unit 116 may be implemented in a processing circuit separate from the processing unit 112.

The control unit 104 includes, for example, the transmission control unit 110 and the processing unit 112, so that a process according to the information processing method according to the present embodiment is proactively performed.

The information processing apparatus 100 performs the process according to the information processing method according to the present embodiment (for example, the above-described (1) process (timing control process) and the above-described (2) process (execution process)), for example, through the configuration illustrated in FIG. 6.

Therefore, the information processing apparatus 100 can continue a process related to contactless communication even when instantaneous interruption is caused, for example, through the configuration illustrated in FIG. 6.

Also, the configuration of the information processing apparatus according to the present embodiment is not limited to the configuration illustrated in FIG. 6.

For example, the information processing apparatus according to the present embodiment can be configured without including the processing unit 112 illustrated in FIG. 6. Even in the configuration not including the processing unit 112, the information processing apparatus according to the present embodiment can perform the above-described (1) process (timing control process), for example, using the external apparatus such as the processing apparatus 400 as the transmission object. Consequently, even in the configuration not including the processing unit 112, the information processing apparatus according to the present embodiment can continue the process related to the contactless communication even when the instantaneous interruption is caused.

For example, the information processing apparatus according to the embodiment can also include one or both of the transmission control unit 110 and the processing unit 112 illustrated in FIG. 6 (for example, realized as an individual processing circuit) separately from the control unit 104.

For example, when communication is performed with each of one or two or more other constituent elements, such as the communication control apparatus 200 and the processing apparatus 400, included in the information processing system according to the embodiment via an external communication device having a similar function and configuration to the communication unit 102, the communication unit 102 may not be included.

The information processing system has been described above according to the embodiment. However, the embodiment is not limited to this form. The embodiment can be applied to, for example, any device capable of performing contactless communication with an external apparatus such as a tablet apparatus, a communication apparatus such as a mobile phone or a smartphone, a video or music reproduction apparatus (or a video or music recording and reproduction apparatus), a game apparatus, or a computer such as a personal computer (PC).

The information processing apparatus has been exemplified in the description as the element included in the information processing system according to the embodiment, but the embodiment is not limited to this form. The embodiment can be applied to, for example, a processing IC, such as a UICC or a SIM, which can be embedded in the information processing system according to the embodiment. In the embodiment, for example, the processing IC may be detachably mounted on the information processing system according to the embodiment.

The communication control apparatus has been exemplified in the description as the element included in the information processing system according to the embodiment, but the embodiment is not limited to this form. The embodiment can be applied to, for example, any processing IC, such as a CLF, that can perform contactless communication with an external apparatus via a connected antenna or an included antenna.

The processing apparatus has been exemplified in the description as the element included in the information processing system according to the embodiment, but the embodiment is not limited to this form. The embodiment can be applied to, for example, a processing IC which is configured to include an MPU or various processing circuits and can perform various processes.

Also, although the external apparatus for outputting an RF magnetic field (carrier) has been described as the present embodiment, the present embodiment is not limited to such a form. The present embodiment can be applied to any device capable of performing contactless communication with the information processing system according to the present embodiment, for example, such as a reader/writer or a device having a reader/writer function such as a ticket gate of a transportation facility.

(Program According to the Present Embodiment)

It is possible to continue the process related to contactless communication even when instantaneous interruption is caused when a program for causing a computer to function as the information processing apparatus according to the present embodiment (for example, a program capable of executing the processes related to the information processing method according to the present embodiment such as "the above-described (1) process (determination process)" or "the above-described (1) process (determination process) and the above-described (2) process (execution process)") is executed by a processor or the like in the computer.

Moreover, when a program that causes a computer to function as the information processing apparatus according to the present embodiment is executed by a processor or the like in the computer, it is possible to provide an effect provided by the processing related to the information processing method according to the present embodiment described above.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it has been illustrated above that a program (computer program) that causes a computer to function as the information processing apparatus according to the present embodiment is provided, but the present embodiment can further provide a recording medium in which the above-described program is stored together.

The above-described configurations express examples of the present embodiment and, of course, pertain to the technical scope of the present disclosure.

In addition, the effects described in the present specification are merely illustrative and demonstrative, and not limitative. In other words, the technique according to the present disclosure can exhibit other effects that are evident to those skilled in the art along with or instead of the effects based on the present specification.

Additionally, the present technology may also be configured as below.

(1)
An information processing apparatus including:
a transmission control unit configured to, when first carrier information indicating that no carrier is detected is acquired from a communication control apparatus capable of performing contactless communication using a carrier with an external apparatus, control a timing at which the acquired first carrier information is transmitted to a transmission object configured to execute a predetermined process according to the first carrier information,
wherein the transmission control unit transmits the first carrier information to the transmission object when a set waiting time has elapsed after the first carrier information was acquired, and
wherein the transmission control unit does not transmit the first carrier information to the transmission object when second carrier information indicating that the carrier is detected is acquired before the waiting time has elapsed.

(2)
The information processing apparatus according to (1),
wherein, when the execution of a process related to another communication interface except for the contactless communication is requested while a process related to the contactless communication is performed, the transmission object is a first transmission object which holds the execution of the process related to the other communication interface until the process related to the contactless communication being performed is terminated, and wherein the predetermined process according to the first carrier information to be executed by the first transmission object is a process of executing the process related to the other communication interface for which execution is held by determining that the process related to the contactless communication is terminated on the basis of the first carrier information.

(3)
The information processing apparatus according to (2), further including:
a first processing unit configured to function as the first transmission object,
wherein the transmission control unit transmits the first carrier information to the first processing unit.

(4)
The information processing apparatus according to any one of (1) to (3),
wherein the transmission object is a second transmission object which performs a process related to the contactless communication by executing an application, and
wherein the predetermined process according to the first carrier information to be executed by the second transmission object is a process of terminating the execution of an application corresponding to the process related to the contactless communication by determining that the process related to the contactless communication is terminated on the basis of the first carrier information.

(5)
The information processing apparatus according to (4), further including:
a second processing unit configured to function as the second transmission object,
wherein the transmission control unit transmits the first carrier information to the second processing unit.

(6)
The information processing apparatus according to any one of (1) to (5),
wherein the waiting time is set for every application, and
wherein the transmission control unit uses the waiting time set for the application to be used in the contactless communication.

(7)
The information processing apparatus according to any one of (1) to (6), wherein the transmission control unit resets the waiting time so that the waiting time does not exceed a time corresponding to information related to the processing time when the set waiting time is longer than the time corresponding to the information related to the processing time indicating an estimate of the processing time when the process is performed to be used in setting of the waiting time in the external apparatus.

(8)
The information processing apparatus according to any one of (1) to (7), wherein the transmission control unit transmits the first carrier information to the transmission object regardless of the set waiting time when a signal of a predetermined pattern is acquired from the communication control apparatus or when information for designating an absent application is acquired from the communication control apparatus.

(9)
A transmission control method to be executed by an information processing apparatus, the transmission control method including:
a step of controlling, when first carrier information indicating that no carrier is detected is acquired from a communication control apparatus capable of performing contactless communication using a carrier with an external apparatus, a timing at which the acquired first carrier information is transmitted,
wherein, in the controlling step,
the first carrier information is transmitted when a set waiting time has elapsed after the first carrier information was acquired, and
the first carrier information is not transmitted when second carrier information indicating that the carrier is detected is acquired before the waiting time has elapsed.

(10)
The transmission control method according to (9), further including:
a step of executing a predetermined process according to the first carrier information to be transmitted,
wherein, in the executing step,
when the execution of a process related to another communication interface except for the contactless communication is requested while a process related to the contactless communication is performed, the execution of the process related to the other communication interface is held until the process related to the contactless communication being performed is terminated, and
the predetermined process according to the first carrier information is a process of executing the process related to the other communication interface for which execution is held by determining that the process related to the contactless communication is terminated on the basis of the first carrier information to be transmitted.

(11)
A program for causing a computer to execute:
a step of controlling, when first carrier information indicating that no carrier is detected is acquired from a communication control apparatus capable of performing contactless communication using a carrier with an external apparatus, a timing at which the acquired first carrier information is transmitted,
wherein, in the controlling step,
the first carrier information is transmitted when a set waiting time has elapsed after the first carrier information was acquired, and
the first carrier information is not transmitted when second carrier information indicating that the carrier is detected is acquired before the waiting time has elapsed.

(12)
The program according to (11),
wherein the program further causes a computer to execute a step of executing a predetermined process according to the first carrier information to be transmitted, and
wherein, in the executing step,
when the execution of a process related to another communication interface except for the contactless communication is requested while a process related to the contactless communication is performed, the execution of the process related to the other communication interface is held until the process related to the contactless communication being performed is terminated, and
the predetermined process according to the first carrier information is a process of executing the process related to the other communication interface for which execution is held by determining that the process related to the contactless communication is terminated on the basis of the first carrier information to be transmitted.

(13) An information processing system including:
an information processing apparatus;
an antenna; and
a communication control apparatus capable of communicating with the information processing apparatus and performing contactless communication using a carrier with an external apparatus via the antenna,
wherein the information processing apparatus includes a transmission control unit configured to, when first carrier information indicating that no carrier is detected is acquired from the communication control apparatus, control a timing at which the acquired first carrier information is transmitted to a transmission object configured to execute a predetermined process according to the first carrier information,
wherein the transmission control unit transmits the first carrier information to the transmission object when a set waiting time has elapsed after the first carrier information was acquired, and
wherein the transmission control unit does not transmit the first carrier information to the transmission object when second carrier information indicating that the carrier is detected is acquired before the waiting time has elapsed.

(14) The information processing system according to (13), further including:
a processing apparatus capable of performing a process in conjunction with the information processing apparatus via communication by another communication interface except for the contactless communication.

REFERENCE SIGNS LIST 10 reader/writer
20, 1000, 2000 information processing system
100 information processing apparatus
102 communication unit
104 control unit
110 transmission control unit
114 first processing unit
116 second processing unit
200 communication control apparatus
300 antenna
400 processing apparatus
500 external apparatus

The invention claimed is:

1. An information processing apparatus, comprising:
a transmission control unit configured to:
control a timing at which first carrier information is transmitted to a transmission object that executes a first process according to the first carrier information based on the first carrier information indicating that carrier is undetected,
wherein the first carrier information is acquired from a communication control apparatus, wherein the communication control apparatus executes a contactless communication with an external apparatus based on a carrier;
transmit the first carrier information to the transmission object based on elapse of a set waiting time after the acquisition of the first carrier information; and
prevent the transmission of the first carrier information to the transmission object based on second carrier information indicating that the carrier is detected,
wherein the second carrier information is acquired before the elapse of the set waiting time,
wherein the transmission object is a first transmission object that executes a second process related to the contactless communication based on execution of an application,
wherein the first process terminates the execution of an application corresponding to the second process based on a determination that the second process is terminated on according to the first carrier information, and
wherein the first process is executed by the first transmission object.

2. The information processing apparatus according to claim 1,
wherein, based on the execution of a third process related to a communication interface except for the contactless communication is requested while the second process related to the contactless communication is executed, the transmission object is a second transmission object which holds the execution of the third process related to the communication interface until the second process being executed is terminated, and
wherein the first process executes the third process related to the communication interface for which execution is held based on a determination that the second process related to the contactless communication is terminated according to the first carrier information.

3. The information processing apparatus according to claim 2, further comprising:
a first processing unit configured to function as the second transmission object,
wherein the transmission control unit configured to transmit the first carrier information to the first processing unit.

4. The information processing apparatus according to claim 1, further comprising:
a second processing unit configured to function as the first transmission object,
wherein the transmission control unit configured to transmit the first carrier information to the second processing unit.

5. The information processing apparatus according to claim 1,
wherein the set waiting time is set for every application, and
wherein the transmission control unit is further configured to utilize the set waiting time set for the application in the contactless communication.

6. The information processing apparatus according to claim 1,
the transmission control unit is further configured to:
reset the set waiting time so that the set waiting time is less than a time corresponding to information related to a processing time based on the set waiting time that is longer than the time corresponding to the information related to the processing time,
wherein the processing time indicates an estimate of the processing time based on the execution of the second process,
wherein the processing time is utilized to set the set waiting time in the external apparatus.

7. The information processing apparatus according to claim 1,
wherein the transmission control unit is further configured to transmit the first carrier information to the transmission object regardless of the set waiting time based at least one of an acquisition of a signal of a pattern from the communication control apparatus or an information to designate an absent application that is acquired from the communication control apparatus.

8. A transmission control method, comprising:
controlling a timing at which first carrier information is transmitted to a transmission object that executes a first process according to the first carrier information based on the first carrier information indicating that a carrier is undetected;
wherein the first carrier information is acquired from a communication control apparatus, wherein the communication control apparatus executes a contactless communication with an external apparatus based on a carrier;
transmitting the first carrier information to the transmission object based on elapse of a set waiting time after the acquisition of the first carrier information; and
preventing the transmission of the first carrier information to the transmission object based on a second carrier information indicating that the carrier is detected,
wherein the second carrier information is acquired before the elapse of the set waiting time,
wherein the transmission object is a second transmission object that executes a second process related to the contactless communication based on execution of an application,
wherein the first process terminates the execution of an application corresponding to the second process based on a determination that the second process is terminated on according to the first carrier information, and
wherein the first process is executed by the second transmission object.

9. The transmission control method according to claim 8, wherein
based on the execution of a third process related to a communication interface except for the contactless communication is requested while the second process related to the contactless communication is executed, holding the execution of the third process related to the communication interface until the second process related to the contactless communication being executed is terminated,
wherein the first process executes the third process related to the communication interface for which execution is held based on a determination that the second process related to the contactless communication is terminated according to the first carrier information.

10. A non-transitory computer-readable medium having computer-executable instructions, which when executed by a computer, cause the computer to execute operations, the operations comprising:
controlling, a timing at which first carrier information is transmitted to a transmission object that executes a first process according to the first carrier information based on the first carrier information indicating that a carrier is undetected;
wherein the first carrier information is acquired from a communication control apparatus, wherein the communication control apparatus executes a contactless communication with an external apparatus based on a carrier;
transmitting the first carrier information to the transmission object based on elapse of a set waiting time after the acquisition of the first carrier information; and
preventing the transmission of the first carrier information to the transmission object based on a second carrier information indicating that the carrier is detected,
wherein the second carrier information is acquired before the elapse of the set waiting time,
wherein the transmission object is a second transmission object that executes a second process related to the contactless communication based on execution of an application,
wherein the first process terminates the execution of an application corresponding to the second process based on a determination that the second process is terminated on according to the first carrier information, and
wherein the first process is executed by the second transmission object.

11. The non-transitory computer-readable medium according to claim 10,
wherein based on the execution of a third process related to a communication interface except for the contactless communication is requested while the second process related to the contactless communication is executed, holding the execution of the third process related to the communication interface until the second process related to the contactless communication being executed is terminated,
wherein the first process executes the third process related to the communication interface for which execution is held based on determination that the second process related to the contactless communication is terminated according to the first carrier information.

12. An information processing system, comprising:
an information processing apparatus;
an antenna; and
a communication control apparatus configured to communicate with the information processing apparatus and execute contactless communication with an external device based on a carrier via the antenna,
wherein the information processing apparatus includes a transmission control unit configured to:
control a timing at which first carrier information is transmitted to a transmission object that executes a first process according to the first carrier information based on the first carrier information which indicating that the carrier is undetected,
wherein the first carrier information is acquired from a communication control apparatus, wherein the communication control apparatus executes a contactless communication with an external apparatus based on a carrier;
transmit the first carrier information to the transmission object based on elapse of a set waiting time after the acquisition of the first carrier information; and
prevent the transmission of the first carrier information to the transmission object based on a second carrier information indicating that the carrier is detected,
wherein the second carrier information is acquired before the elapse of the set waiting time,
wherein the transmission object is a first transmission object that executes a second process related to the contactless communication based on execution of an application, wherein the first process terminates the execution of an application corresponding to the second process based on a determination that the second process is terminated on according to the first carrier information, and wherein the first process is executed by the first transmission object.

13. The information processing system according to claim 12, further comprising:

a processing apparatus configured to executes a process in conjunction with the information processing apparatus via communication through a communication interface except for the contactless communication.

* * * * *